United States Patent [19]
Othmer

[11] 3,772,187
[45] Nov. 13, 1973

[54] SEWAGE TREATMENT PROCESS

[76] Inventor: Donald F. Othmer, 333 Jay St., Brooklyn, N.Y. 11201

[22] Filed: July 14, 1971

[21] Appl. No.: 162,402

[52] U.S. Cl............................ 210/7, 210/8, 210/48, 210/50, 210/60, 210/195, 210/220
[51] Int. Cl............................................... C02c 1/06
[58] Field of Search .................................. 210/3–9, 210/14–15, 194–197, 220–221, 48, 50, 60, 63

[56] References Cited
UNITED STATES PATENTS

| 3,477,947 | 11/1969 | Kappe | 210/194 X |
| 3,444,076 | 5/1969 | Sekikawa et al. | 210/15 X |
| 3,574,331 | 4/1971 | Kurosawa et al. | 210/15 |
| 3,449,245 | 6/1969 | Johnson et al. | 210/321 X |
| 3,331,771 | 7/1967 | Watson et al. | 210/18 X |
| 3,662,890 | 5/1972 | Grimshaw | 210/15 X |
| 3,560,376 | 2/1971 | Heil | 210/7 |

FOREIGN PATENTS OR APPLICATIONS

| 3,831 | 1915 | Great Britain | 210/15 |

Primary Examiner—Michael Rogers

[57] ABSTRACT

Domestic sewage and other polluted waters may be treated under a pressure of ½ to 5 atmospheres gauge or more with dissolved oxygen, or air, to supply the BOD. The oxygen-containing gas is drawn into the suction of a feed and recycle pump which agitates the liquid-gas mixture, and increases gas solubilization as it is being compressed. Simultaneously, any solids which are present are comminuted in being pumped to the pressure oxidation tank. The higher than atmospheric pressure increases oxygen solubility, concentration, and hence chemical or biochemical reactivity. Thus, a much smaller residence time and vessel is required, the polluted water is withdrawn and depressurized to atmospheric pressure at which pressure some of the dissolved oxygen and other gases are released due to lower solubility, and vented. Most of the liquid after depressurization is recycled to the influent stream for repressurization and additional oxygen dissolution. The recycle may amount to 2 to 50 times, and some sludge obtained may also be recycled. A water turbine may recover some of the mechanical energy used by the pump. The process may be used by itself or as an adjunct to other processes for treating polluted waters, and also for the oxidation of sludge.

27 Claims, 1 Drawing Figure

Patented Nov. 13, 1973
3,772,187
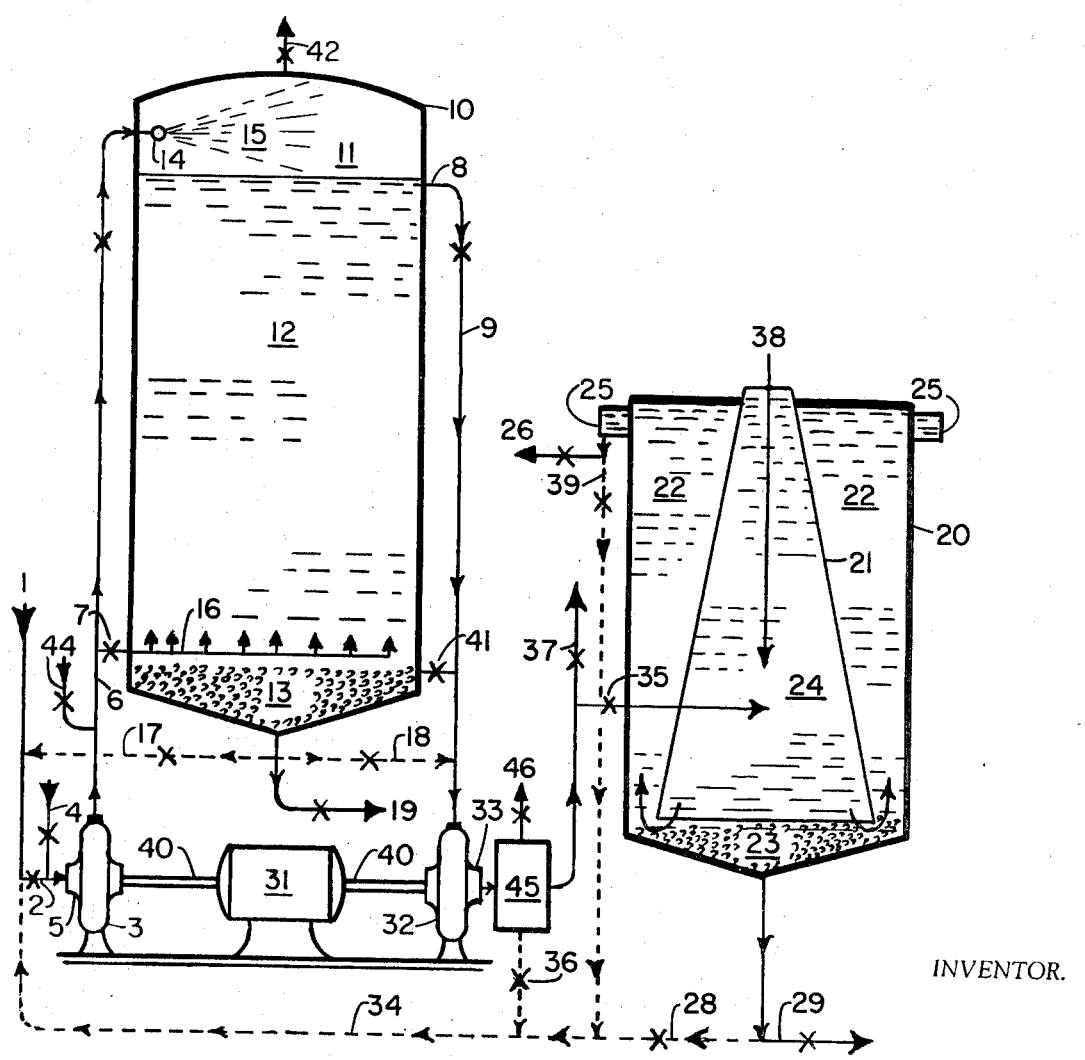
INVENTOR.
Donald F. Othmer

SEWAGE TREATMENT PROCESS

The process of this invention is an improvement in the treatment of aqueous waste liquors, including sewage from domestic and industrial sources. It may be used by itself, or either before or after other conventional chemical, physical, or biological treating processes. It oxidizes, by gaseous oxygen as such, or in air, the organic waste materials suspended or dissolved in the waste liquors under a superatmospheric pressure through either a chemical reaction, a biochemical reaction, or both. Simultaneously, it allows an efficient sedimentation during the pressure oxidation to remove as sludge the insoluble solids and those made insoluble by a partial oxidation.

The biological oxygen demand, BOD, or chemical oxygen demand, COD, of a waste liquor containing organic materials, is reduced or satisfied by a biochemical, i.e., aerobic, oxidation which supplies this demand. Usually air is the source of the oxygen for the microorganisms which feed on the wastes and convert them to carbon dioxide in their life processes; but more recently, oxygen as such in a concentration above 90 percent has been used in aerobic treatments.

There are many disadvantages to aerobic, usually called Secondary, treatments; and at best they require large treating plants with long processing times and various related operations, all giving unpleasant odors. If installed near residential areas land values usually deteriorate because of their less than agreeable proximity. Even more noxious they are when utilized with salt water. Here also, the salt water used may cause variations in the operation because of its effect on the bacteria accomplishing the aerobic process.

Furthermore, sewage treating processes, based on coagulation and sedimentation, which are usually called Primary treatment and which preceed the Secondary or aerobic systems, may utilize a relatively high pH of 10 to 11; and at this pH, the micro-organisms are almost completely destroyed.

On the other hand, chemical oxidation has been found possible in various processes for treatment of waste liquors using either air or oxygen, at temperatures which are relatively high compared to those for aerobic processes, and at very considerable reaction velocities, as, for example, in co-pending U.S. Patent application Ser. No. 35,485 of May 7th, 1970, entitled Method for Producing Pure Water from Sea Water and Other Solutions by Flash Vaporization and Condensation. To initiate the oxidation, and make it self maintaining the liquid must be heated well above the boiling point of water where oxygen is not soluble in the usual sense.

It has now been found that oxidation of organic wastes by chemical action and by biological action may be accomplished at a considerable increase in rate by the use of oxygen containing gas from a concentration of that of air — approximately 20 percent — up to that of a commercial grade of 90+ percent or even higher purity up to 99+ percent when the treatment of the polluted waters is at a pressure above one atmosphere, preferably from ½ to 5 atmospheres gauge pressure. The high pressure greatly increases the solubility of the oxygen, thus its concentration for the chemical reaction. Recycling the liquid being treated from atmospheric to the superatmospheric pressure, allows additional oxygen to be added in each cycle by dissolution as it is consumed to reduce or satisfy the BOD of the waste liquor or sewage.

Other systems of oxidizing sewage aerobically have used suction caused by a Venturi or an orifice for aspirating air into a stream of waste liquors *after* passing through a pump. However, these have necessarily *reduced* the pressure on the liquid system at the point of introduction of the air. Such a process not only could not take advantage of the greater reactivity at the higher pressure due to the greater oxygen solubility and the residence in a *pressure* chamber; but they have actually worked at subatmospheric pressure to reduce the pressure and hence the solubility for oxygen of the liquid being treated.

By the method of this invention, air or oxygen under slightly higher pressure may be added to the polluted water entering the pressure tank, at a pressure of ½ to 5 atmospheres gauge pressure or even more. Small bubbles and agitation increase the rate of solubility of the oxygen added, which here, as elsewhere in this description and claims, may be from 20 to 99 +% $O_2$. If oxygen in tanks under pressure is available for use, it may be better to add it to the liquid after being pressurized by the pump, than before.

It has now been found, however, that the oxidation usually accomplishes its purpose of purifying the liquid very much faster by the process of this invention wherein the oxygen is sucked in by the cavitation on the inlet of the pump feeding and recycling the polluted water. The pump violently agitates the oxygen in the liquid to give very intimate contact; and then the bubbles of gas are compressed so as to go into a solution of greatly increased concentration under the higher pressure at the pump discharge. In the prior art, air has been allowed to go into solution at the very much lower pressure of an aspirator discharging to a non-pressurized tank, or one under partial vacuum. Thus, a much more effective use is now made of the oxygen supply in a much more rapid reaction, which means a higher capacity and lower volume of the tank as well as a more thorough treatment of some materials which otherwise are not oxidized.

Therefore, among the objects of the present invention are:

to reduce the BOD and COD of waste waters, including sewage, by a liquid phase oxidation in a small unit of relatively large throughput capacity and low residence time compared to that of the usual aerobic process;

to oxygenate such sewage when in either salt or fresh water, or, in some cases, within acidic or alkaline influent waters having a pH range of 5 to 11;

to process sewage and/or sludge therefrom for reduction of BOD in a closed system, with the elimination of odors;

to oxygenate such waste water to reduce its BOD in a pressure vessel while at the same time accomplishing a coagulation, flocculation and sedimentation as a sludge of solids, either originally present or formed by the oxygenation, and with or without the prior addition of lime to make alkaline, and/or coagulants known to assist such clarification process;

to accomplish such oxidation in a vessel under a relatively higher pressure than atmospheric, preferably from ½ to 5 atmospheres gauge pressure, so as to increase the solubility of oxygen, its concentration, and hence the speed of the reaction; and thus to reduce the size of the equipment;

to reuse much of the energy required for pumping the liquid and gas stream containing oxygen into the pressure oxidation vessel by allowing the outflow to pass through a turbine or other form of mechanical reconverter of this compression energy.

There are other objects of the invention which are explained better by the following description; and, in general, they are to accomplish the advantageous operation of this process for the removal of pollution of waste waters.

In the accompanying drawing describing the process, there is no scale; relative sizes and levels of different actual members are not indicated; and only the usual information of a process flow sheet is depicted diagramatically and without the mechanical details known to those familiar with such equipment.

The FIGURE is thus a flow sheet diagramming the methods for accomplishing this invention. Many variations are possible, as will be considered in describing the various liquid, solid, and gas flows. Some specific examples are given for the operation of the various possible flow patterns in handling specific polluted liquors by the process of this invention.

The standard units of equipment of the art are used within the specifications of the process. The pressure system at its base must be designed for process operation of ½ to 5, or, in special cases up to 10 atmospheres gauge, temperatures to 125°F, recycle from 0 to 50 times, oxygen feed to 2 to 5 times the solubility of oxygen at the high pressure.

With reference to the drawing, it will be noted that there is a pressure oxidation in the tank, 10, a feed and recycle centrifugal pump, 3, of one or more stages for handling the influent of waste waters entering at 1 and passing a throttling valve, 2. The influent may have been previously screened to remove large solids, and then have been comminuted to a maximum particle size of about one-fourth inch. Such comminution is not usually necessary because the action of the centrifugal pump and of the turbine decompressor will suffice for breaking up particles normally present in domestic sewage. Also, the desolubilizing of the dissolved gases and their expansion in going through the decompression step, serves to "puff" and disintegrate any solids present.

The pressure of the pump, 3, discharges the polluted liquid through pipe, 6, into vessel, 10, the pressure oxidation tank. A valved pipe, 4, supplies air or oxygen at the inlet, 5, of the pump, 3, which is drawn into the influent stream. This suction is due either to the normal cavitation of the centrifugal pump operating under a slightly negative suction head which may be controlled by the throttling valve, 2, or due to a slightly higher gas pressure of the oxygen or air supplied by the valved line, 4, if the suction pressure at 5 is positive. Usually the source of air or oxygen is under atmospheric pressure drawn in by a negative suction head at 5, the inlet of the pump. The pressure tank, 10, has a lower part, 12, filled with liquid undergoing oxidation and, in some methods of operation, also undergoing sedimentation, with sludge settling at 13. A supernatant part, 11, is filled with gas.

In case oxygen under pressure is available, it may be added through valved line, 44, without the benefit of mixing to aid solubilizing in the pump, 3, but without the necessity of recompressing in 3. It may be mixed adequately on entering tank, 10, as small bubbles.

The discharge line, 6, of the pump, may lead to a lower valved connection, 7, of the pressure tank, 10, with an internal sparger, 16, having many small holes — or other system to give uniform distribution of the influent across the cross-section of 10, and also to minimize agitation. Alternatively, the liquid may be passed to a higher point, and a spray head, 14, for generating a spray, 15, of the liquid into the space, 11, for accumulation of gas over the space, 12, filled with liquid.

Tank, 10, is thus operated as a pneumatic pressure tank in the usual domestic water supply system using a pneumatic tank with the pressure of liquid and gas supplied by pump, 3, working against the pneumatic pressure thus generated in 11. A sufficient excess of supply of oxygen or air is always provided at the suction of the pump to maintain this supernatant gas automatically.

Rapid dissolution of the oxygen or air in the liquid is accomplished by the vigorous mixing action and compression in the pump and in the line, 6, up to the solubility as determined by the pertaining pressure and temperature. This dissolution may be augmented somewhat by spraying the liquid from 6 through spray nozzle, 14, under the high pressure into the supernatant oxygen or air in the space, 11.

The liquid in 10 after the contacting and a greater or lesser reaction of the organic materials in the liquid with oxygen or air under pressure, is withdrawn from a low level by valved line, 41, if the spray, 14, is used; or from a high level at 8, if the inlet at 7 and 16 is used. In either case, the liquid at first substantially saturated with oxygen and with gas bubbles therein, passes the distance of the height of the tank, 10, to give the maximum residence time for the aerobic or chemical oxidation supply of the oxygen demand of the organic substances present.

While spraying at 15 is indicated, other methods of subdividing the influent stream for intimate contact with the gas in 11 may be used.

The resulting oxidation usually produces a readily sedimented sludge which settles to the bottom, 13. Tank, 10, may be simultaneously a counter-current, solid-liquid contactor, with the liquid rising from 16, contacting settling flocs of solids to remove much or most of the turbidity in the conventional action of such units, with the more or less clarified liquid discharging at 8. Usual coagulants or other materials for aiding the clarification may be added, if desired, to the influent before entering at 1, also lime to pH 10 or 11, polyelectrolytes, fly ash, etc.

Whether the liquid containing dissolved gas leaves 10 at 8 and the line, 9, or at 41, it passes to the inlet to a water turbine, 32, of a type which recovers the expansion energy of the decompressing gas, and the energy due to the combined static and pressure head of the liquid.

Thus is recovered a major part of the energy required by the pump, 3, for the initial pressurizing of the liquid and the oxygen-containing gas. (The oxygen which is consumed in the oxidation makes an equivalent volume of $CO_2$ — although this has a higher solubility in water than does oxygen — and the nitrogen from the air, if used, is also the same volume to be decompressed.) The balance of the energy used by the pump over that recovered by the turbine, 32, is supplied by the motor, 31, operating on a common shaft, 40, with both the pump, 3, and the turbine, 32. Other devices to recover this mechanical energy may be used when more convenient.

The oxidative action of the process may be used equally well if the turbine, 32, is not used; and the value of the turbine is its ability to recover energy. Thus, it may be eliminated in small installations if desired and a simple throttling valve substituted which wastes the mechanical energy. Also, while a centrifugal pump is indicated at 3, any other suitable pumping mechanism may be used, particularly if it combines good comminution of soft solids and agitation.

The disintegration effect on any particles in suspension of this decompression and dissolution of gas, is very considerable, whether accomplished in a turbine or in a valve.

In those cases where it is desired to recycle the sludge, 13, originally present and settled or formed due to the oxidation in 10, so that it may be oxidized further, some or all of the sludge collected at 13 may be drawn through valved line, 17, to join the influent liquid. The sludge may instead be withdrawn as such from the system, either continuously or intermittently, through valved line, 19, for separate processing; or it may be discharged with other liquid through valved line, 18, through the turbine for recovering the energy due to its pressure, and thence through the subsequent treatment.

Likewise, if valved lines, 41 and 18, are closed, and 10 is operated as a sedimentation unit with feed in at 16, clear effluent may discharge, as noted above, at 8, then through pipe, 9, and turbine, 32. Coagulation aids help if added to influent at 1.

The discharge of the turbine through 33 allows the depressurized liquid and any gas which has come out of solution due to the lower pressure to leave the system through the valved line, 37, or to pass through the valve, 36, and the pipe, 34, to join the influent to the recycle pump, 3, for further oxidation.

Alternatively, a part or all of the liquid, particularly if tank, 10, has not been operated as a sedimentation unit, may be passed through valve, 35, into the tank, 20, operated as a sedimentation unit, and at a substantially lower pressure, usually atmospheric.

In some, but not all, cases a degassing chamber, 45, may be used to allow gases (e.g., nitrogen if air is used), desolubilized at the lower pressure, to separate from the liquid and to be vented at 46. This may be preferable to the higher pressure vent, 42, and expansion energy is utilized.

The tank, 20, is a solids-liquid contactor for coagulation, flocculation, and sedimentation, and it may be desirable to add some materials to aid in these operations, those commonly used in the art or those giving the improved performance of U.S. Pat. Nos. 3,388,060 and 3,338,828. Such addition of chemicals may be done through line, 38. The upper part of the volume, 24, inside the internal cone, 21, is used as a mixer for these chemicals with the liquid from tank, 10, via the turbine, 32. Any gas, as $N_2$ or $CO_2$ coming out of solution due to the depressurization of the liquid, will act as an excellent means of mixing these chemicals with the bulk of the liquid; or other mechanical mixers common in the operation of such equipment may be used. This sedimentation tank may be covered and have a vent to lead off these gases if desired. In some cases, the $CO_2$ may be used in other processing, e.g., for the neutralization of lime and reduction of pH.

Sedimentation may be controlled here better in 20 with particular addition of coagulants as an improvement over that accomplished in 10, if it also is used as a sedimentation tank, or as the only such unit if 10 is operated merely as the pressure-oxidation tank.

As in the usual operation of such a solid-liquid contactor as 20, the liquid, 24, in the central cone is mixed, some coagulated flocs separate, the mixture flows downwardly below the skirt of the cone, 21, and rises in the space, 22, while the floc settles to form a sludge, 23. This may be slowly agitated to beat down and partially dewater the sludge by some conventional device (not shown). Sludge passes out through valved pipe, 29, to discharge from the system.

Alternatively, sludge may be recycled through valved pipe, 28 and 34, to join the influent and recycle for further oxidation in 10 and then back through the system to be discharged ultimately at 19, or it may be continuously recycled in those cases where total oxidation of all sludge is desired. The organics in the sludge are at least partially oxidized with each cycle in the tank, 10. Again, if a small amount of "activated sludge" is desired in tank, 10, to allow the microorganisms developed therein to generate and maintain an aerobic action in 10, only a small part of this sludge, 23, may be recycled to tank, 10.

The relatively clear liquid overflow of 20 passes into the standard discharge trough, 25, here shown as circumferential; and part or all of it may be discharged from the system through the valved line, 26. In those cases where the desired biological or chemical oxidation is not complete in the residence time of one pass through the tank, 10, part of the liquid overflowing 20 through 25 is recycled back through valved pipes, 39 and 34. The valve, 2, allows the throttling of the liquid to allow a lower pressure and a cavitation at 5. At this point, the cycle is complete.

While in the above it is noted that, in some cases, the oxidation may go faster at higher pressures of oxygen up to 10 atmospheres gauge, this may also have some disadvantages, and a pressure of not over 5 atmospheres gauge is usually preferred. Some part of this pressure will always be hydrostatic, and the solubility of the oxygen will be correspondingly greater at the bottom of 10 therefore. Also, when an excess of oxygen over its solubility is allowed to enter with the influent, this may desirably stay in the form of very fine bubbles. As the soluble oxygen is used in the oxidation, this gaseous oxygen becomes available for dissolution to continue the liquid phase oxidation of the pollutants.

The Pressure Oxidation Process

The oxygen which is drawn into the suction of the recycle pump, 3, as air or as oxygen, may be controlled to be from 1 to 50 parts per million (ppm) oxygen based on the recycling liquid. A larger amount may be used to supply oxygen used in the pressure-oxidation. However, such excess over the solubility in water is not fully utilized and is an economic loss if oxygen is used. In any case, it is better to recycle the liquid several times with fresh additions each time. With sludges, up to 50 recycles are used.

Under the agitation engendered in the pump, the oxygen is broken up into fine bubbles; and because of the increasing pressure in passing through the pump, it goes into solution rapidly because of the very large contact surface of the small bubbles, and particularly because the solubility of oxygen in water greatly increases with increasing pressure. This much higher concentration of oxygen in the polluted water than is possible at atmospheric pressure, greatly increases the rate of oxidation of the waste materials in the sewage compared to that under atmospheric pressure. A range of pressure from about ½ atmosphere to 5 atmospheres has been found to be economically satisfactory when the increased costs of pumping up to the higher pressures are balanced against the corresponding increased speed of oxidation of the undesirable organics. Higher pressures may, however, be used at increasing reaction rates to give smaller plants.

The length of residence time in 10 is chosen to allow the oxidation of the organic material under the high reaction rate of the oxidation under pressure. Usually from 10 to 60 minutes is ample, somewhat longer and up to 5 hours for sludges. However, increasing the pressure of oxygen to 10 atmospheres reduces the residence time required at 5 atmospheres by about 25 percent, and in those cases where the higher pressure is warranted, it may be justified.

While much of the organic material may be oxidized, it is worthwhile to note that, in most cases, the partial oxidation of a large and complex molecule, as those forming a colloidal solution, will usually break the colloid, otherwise very difficult to settle out; or it will produce some insoluble, relatively easily settleable solids. Thus, if the sludge is sedimented out and removed, a relatively small amount of oxidation may remove, with a concomitant settling, most of the BOD from the water.

Particularly, when a relatively clear liquid has a BOD due mainly to dissolved organics, including coloring matter, the oxidation thereof will often produce a sludge containing much of the original BOD; and the oxygen requirements with efficient sedimentation are only a small part of the indicated total BOD of the influent.

If the BOD of the liquid is greater than the solubility of oxygen at the given temperature and at the higher pressure of the oxidation tank, 10, the oxidation which takes place in 10 cannot be completed, although much of the BOD may be in the sludge, removed otherwise. One way of aiding the further oxidation is to allow a higher amount of oxygen or air to enter at 4, than the solubility under the conditions in 10, and this will give a supernatant gas phase, 11. The spray, 15, coming through 14, through this gas phase, will allow additional oxygen contact with the liquid for additional oxygen to be used for the reaction, not only in the spray itself, but in the volume hold-up during the residence in 10. A vent at 42 allows the removal of gases, particularly nitrogen, if air is used, which may be greater than its solubility in the liquid discharging from 10. Carbon dioxide may be another gas — along with some unused oxygen — but the solubility of carbon dioxide is so high that it will usually all be in the solution under the pressure in 10. Alternatively, rather than discharging from the vent, 42, the expansion of these gases through the turbine, 32, will give energy.

Further oxidation is secured by recycle of liquor incompletely oxidized in 10 around through the suction of oxygen in at 4 and to another residence in 10. Recycle may be from 0.1 to 50 times.

An additional oxidation or removal of BOD will be accomplished by recycle back to join the influent. If there are large amounts of solids to be handled in the original polluted waters, and BOD of this is high, say considerably above 200 ppm, it may be desirable and more economical in use of oxygen to have a number of recycles of the liquid in order to dissolve sufficient oxygen in a number of additions to the polluted water, to accomplish the oxidation in the pressure tank. Most frequently, this may be regarded as chemical oxidation, but under many conditions there will also be more or less aerobic processing, depending on the bacterial life in the liquid, the pH and other circumstances.

The turbine has been indicated as a means of recovering power and the turbine and the pump are shown to be connected on the same shaft, 40, which is common with a motor, 31. Additional power needed for the pump over that recovered by the turbine, is thus supplied by 31.

The compression of the gas and the friction in the pump and pipes will tend to cause a build-up of heat in the pressure-oxidation tank augmented by the heat of the oxidation, whether chemical or aerobic. This heat increases the temperature; and thus is not objectionable if the temperature does not go above the maximum temperatures for aerobic treatment, depending on the particular microorganisms present. The increase of temperature decreases the solubility of oxygen and hence its reactivity; but it increases the reaction rate. Except in the digestion of sludges, this is not usually a problem. In general, the desirable temperature in 10 will be below 125°F.

On the other hand, the expansion of the air or oxygen which has been dissolved in the tank, and which may contain not only oxygen but also nitrogen and carbon dioxide, $H_2S$, methane, etc., will take place in the turbine, 32; and some gases — particularly $N_2$ if air is used — may tend to come out of solution. This gas expansion will, of course, be much less than the gas compression in the pump, 3, because some of the oxygen will have been utilized in chemical combination with the dissolved or suspended organic material in the waste waters which are still solids; and the $CO_2$ formed is much more soluble than oxygen. Thus, there will always be some heating in the system on balance.

In those cases where the sewage originally is on the alkaline side, or has been so treated in a process prior to this, particularly if it contains calcium hydroxide in solution, the carbon dioxide resulting from the oxidation in 10 will neutralize the lime, reduce the pH of the solution, and precipitate calcium carbonate, since its solubility is only 0.1 to 0.2 percent. Such precipitate will be caught in the sludge, 13, or in later sludge formation. Where the pH of any effluent is high — possibly 10 to 11 if due to lime — it is lowered by $CO_2$ coming from the incineration of sludge or fuel.

Gravity Head in Pressure Oxidizing Tank

As noted above, the FIGURE is not to scale, and the relative dimensions of 10 are indeterminate therefrom. In the conventional sedimentation tank or solid-liquid contactor operating at atmospheric pressure, the diameter may be large compared to the height. A pressure tank is required for the oxidation in this process — preferably of steel; and a greater ratio of height to diameter may be desirable, although the sedimentation function and distance may limit the height desired from the standpoint of mechanical design.

However, in this case of operation under pressure to secure the higher oxygen concentration and reactivity, the height may be made considerably greater to advantage when the influent enters at 16. A depth of 20 to 65 feet or more gives a corresponding hydrostatic head with a lesser gas pressure above.

The pump then is not merely working against the pneumatic pressure of the supernatant gas, but also has the relatively large static head of the depth of liquid undergoing the pressure oxidation. In this case, if the tank, 10, is in itself a solid-liquid contactor of any of the conventional arrangements wherein the liquid with dissolving gas bubbles comes in near the bottom at 16 and containing or generating sludge as it is oxidized, it rises slowly to the top against a descending stream of flocculated solids. Thus, the tank, 10, may by itself accomplish the purpose of the usual Primary and the usual Secondary treatments, i.e., a sedimentation and an oxidation, due to the oxygen dissolved therein.

The normal gentle agitation which is desired in a solids-liquid contactor for accomplishing the Primary coagulation and then flocculation, is obtained here by the dissipation of dissolved gas due to the lessening hydrostatic pressure as the liquid slowly rises. Thus, if the height of the liquid in the tank is, say, 65 feet, which would amount to approximately two atmospheres of hydrostatic pressure, the solubility of the oxygen will slowly decrease as the pressure hydrostatic decreases in the rising liquid. There may be, however, as much as two or three atmospheres pneumatic pressure in the space, 11, above.

Aeration usually violently agitates an aerobic tank. The amount of oxygen in this operation is closely controlled, depending on its solubility in water. Also, oxygen alone may be used to reduce to one-fourth the gas volume. Of great importance is the effect of pressure, which, at 5 atmospheres gauge (6 atmospheres absolute) reduces gas volume to one-sixth. These effects combine to minimize gas volume and agitation and to allow sedimentation.

Much of the oxygen is being used up in the oxidation, with accompanying formation of carbon dioxide, which is over 30 times more soluble. If pure oxygen is used, there is, of course, no nitrogen. However, if air is used, the concommitant nitrogen which has been sucked in due to the cavitation of the pump, 3, will become less and less soluble and there will be minute bubbles formed as the liquid rises slowly in the tank.

With this deep tank, 10, the effluent to the turbine regenerative system may be taken off near the top at point 8 through pipe, 9. The overflow at 8 may be designed so that the overflow entrains gas and discharges it to the turbine. Or liquid alone may pass off at 8, down 9, with a total pressure head equal to that of the static head of the liquid, plus the supernatant gas pressure at the top which may be any desired amount additional. The discharge of any gas at the top would then be from the vent, 42.

In this embodiment of the invention, the operation may be exactly that of a deep sedimentation tank with the additional oxidation process; and the tank may settle sludge, 13, in a conical bottom. This sludge may either be removed through valved line, 19, for normal disposition as sludge, or go back to the influent through valved line, 17, if it is desired to supply oxygen for substantially all of the BOD present. Alternatively, the sludge solids may be passed through the turbine, 32, for recycle, and thus allow the recovery of the mechanical energy due to the pressure. A small amount of sludge recycled may improve any aerobiosis.

The tank, 10, if sufficiently high to give the desired pressure hydrostatically at its base, may have atmospheric pressure at the top, either entirely open or with valve, 42, open.

The normal internals of a conventional solids-gas contactor or sedimentation tank may be used, but are not indicated here since they are well known as to design and operation to those familiar with sewage treatment. The sludge settling in the bottom of the cone may also have a simple, slow agitation, the means for providing which also is not indicated; as this slow agitation also is standard practice in the removal of sludge from a solids-liquid contactor or sedimentation tank.

Total Treatment Of Raw Sewage

Raw municipal sewage is screened to remove particles larger than 1 inch and enters as influent at 1, with a BOD of about 200 ppm. The pressure oxidizing tank is used also as a sedimentation tank, and air is sucked in at 4 to the recycle pump, 3.

Inlet to the tank, 10, is through sparger, 16, and the oxidation greatly reduces the BOD of the liquid discharging at 8, while most of the solids already present and those which are formed during this oxidation are coagulated, flocculated, and sedimented against a rising current of the smaller solids. These are thus entrained to form a sludge at 13, which may be further beaten down for dewatering by any of the usual devices. Valves 17, 18, and 41 are closed; and sludge is removed at 19. The overflow liquor coming from 9, which has been clarified and its impurities partially oxidized, passes through turbine, 32, through line 34 (valve 35 being closed) and back to the recycle pump, which also sucks in additional air. Effluent is discharged from 37 having a slight turbidity and a reduction of BOD from 60 to 80 percent. The hold-up time in tank, 10, should be from 30 minutes to several hours, depending on whether coagulating and deflocculating agents have been used with the influent. When 90+ percent oxygen is used instead of air, the oxidation and sludge formation are much more rapid; and nitrogen bubbles are not rising to disturb the sedimentation, which is greatly improved to give a clear effluent.

In the use of tank, 10, as a pressure-oxidizer only, the influent with air drawn in at 4 is passed through the pump, 3, and through the spray at 15. After a 20-30 minute residence time in 10, liquid is discharged at 41, with any sludge collected at 13 also discharging through 18, thence through the turbine, thence through line 34, and back to the suction of pump, 3. A substantial oxidation of the organics is possible, using merely air in at 4 to supply the BOD by the normal aerobic effect if the requisite type and number of microorganisms are present, by chemical oxidation alone if they are not, or by both.

The discharge of the turbine is divided, part for recycle through line 34, and part to pass through valved line 35 and be passed to the sedimentation unit, 20. This is operated in conventional fashion; and the sludge from this is likewise discharged from line 29 with a part passed back through line 27, for further oxidation treatment in 10. The organic material of the sludge in this case and other organics is largely oxidized in 10 and only a small part of the sludge is removed from 29. Additives for coagulation, also lime, activated fly ash, and conventional polyelectrolytes, may be used to give fully reclaimed water as effluent at 26, possibly requiring pH adjustment.

Effluents From A Primary Sedimentation

When polyelectrolytes, activated fly ash, and other coagulants and lime are used in a well operated Primary treatment, according to U.S. Pat. Nos. 3,388,060 and 3,338,828, an effluent is obtained from an influent of 200 BOD with 90 percent removal of BOD and almost no turbidity.

In treating this water, already almost reclaimed, the pressure oxidizing tank, 10, is operated also as a clarifier; and the oxidation of the remaining organics is accomplished to give an even better effluent at 8, which passes through the turbine, 32, and thence out to 37, with little or no recycle necessary, and practically no turbidity. The small amount of sludge which is removed at 19 is returned to the raw sewage inlet of the original sedimentation process. It contains some calcium carbonate formed by the action of $CO_2$ coming from the oxidation on the dissolved $Ca(OH)_2$, along with any insoluble coagulants added.

In this case, commercial oxygen of a purity of 90+ percent is used at 4, in an amount about 50 percent greater than the BOD of the influent to 10, which, with a BOD of 20 theoretically requires an input of only 20 ppm of $O_2$. An excess of 10 to 50 percent is used or 22 to 30 ppm.

Here the use of this oxidizing step after an earlier removal of 90 percent of BOD by a very efficient Primary sedimentation, will have to handle only such a small amount of oxidizable material that elementary oxygen may be used very economically to reduce the time involved and to complete the reaction to give a final effluent which by a suitable sedimentation in tank, 10, used as an efficient solids-gas contactor, will give an effluent practically free of both BOD and turbidity. This use of 22 to 30 ppm of $O_2$ is easily within the range of economical oxidation using oxygen, which should not usually cost more than 1 cent per pound, often much less. Thus, for each million gallons per day there might be required from 165 pounds of oxygen if complete utilization were possible, to 250 pounds under the efficiencies which might be expected in a reasonably efficient process, or the cost of $O_2$ would be $1.65 to $2.50 per million gallons. Microorganisms are eliminated by the high pH of 10 to 11 due to lime in the preliminary processing. Thus, the supply of its residual BOD is by chemical, rather than aerobic, action. No chlorine is needed to disinfect the final effluent, practically free of BOD; and, as chlorine is many times as expensive on an oxidizing basis as oxygen, a distinct economy may result.

In this example, if there is a recycle ratio of 2 entering the inlet, 5, of pump, 3, and enough oxygen was put in to just equal the solubility, it would seem that the theoretical recycling might be 2 times, i.e., 2 times 10 ppm, the solubility of oxygen in water. In practice, it has been found that a recycle of 3 to 5 may be desirable. It is, of course, noted that the cycle of pressure, and then no pressure, of this system with the time of residence during the pressure part to allow the time of reaction between the solids with BOD and the oxygen, serves as a saturator and increases the rate of dissolution of $O_2$.

Also, this pressure — no pressure system serves an equally good purpose in those cases where there is a large amount of BOD and considerable $CO_2$ developed due to the oxidation; and the amount of this $CO_2$ may be beyond the solubility limits, particularly under the low pressure of the expansion, and the $CO_2$ then will be vented.

If the effluent from 37 has a pH above 7 due to $Ca(OH)_2$, this may be reacted with $CO_2$ coming from incineration of sludge or otherwise.

Sewage Sludge

The oxidation of sewage sludge from primary or secondary treatment in conventional treatment plants to remove its BOD may be accomplished by the use of the pressure oxidizing tank, 10, operated with the recycle system and using air or preferably oxygen inlet at 4. Because of the high BOD of this material, there may be required from 5 to 50 recyclings, with a total residence time as much as 4 or 5 hours. The feed to tank, 10, operating as both an oxidizing unit and as a sedimentation unit, will be in at 16 and the discharge at 8. Some sludge is withdrawn for recycle at 18; and a small percentage is withdrawn, representing dirt, inorganics, and those more recalcitrant organics. The effluent liquid discharging from 32 may be passed through 35 to sedimentation unit, 20, with addition of appropriate coagulants, 38, known to the art, to give a discharge of clear liquid at 26. Alternatively, the discharge from 32 may be passed back—0 to 100 percent—for clarification to the Primary treatment of the original process.

Tank, 20, may be an efficient solid-liquid countercurrent contactor; and a feed of lime to bring the pH to 10 to 11, polyelectrolytes, and fly ash or activated fly ash may be added by line 38, as described in U.S. Pat. Nos. 3,388,060 and 3,338,828 and mixed in at 24. The effluent at 26 then may have a turbidity below 1 on the Jackson scale and the BOD may be not over 20 ppm.

Many modifications of the process are possible, using known equipment to secure the advantageous results. All of these variations are a part of this invention within the definition and spirit of the accompanying claims.

I claim:

1. The process of oxidation of pollutants originally present in an aqueous liquid comprising the following steps:

a. pressurizing all of said liquid being treated while carrying all of said pollutants originally present, and dissolving oxygen therein while in a pressure zone maintained under a maximum pressure of from one-half to ten atmospheres gauge pressure and at a temperature below 125°F, so as to increase the solubility of oxygen and of other gases in said liquid;

b. after at least some of said pollutants of all of said liquid have been oxidized while in said pressure zone, withdrawing a more pure liquid therefrom and subjecting said more pure liquid to a depressurization, wherein some gases are desolubilized at the lower pressure;

c. releasing from solution in said liquid and venting therefrom at least some part of said desolubilized gases;

d. passing immediately at least part of the more pure liquid, partially degassed, to form a joint stream with the influent of said aqueous liquid, said joint stream being repressurized while being passed continuously to said pressure zone, so that the solubility for oxygen in the liquid in said joint stream is increased; and dissolving more oxygen in said repressurized liquid; and e. repeating said pressurizing and dissolving of oxygen in said liquid originally carrying all of said pollutants in an alternating cycle with said depressurizing and partial release of dissolved gases therefrom, for from 2 to 50 times with a total residence in said pressure zone of at least 10 minutes.

2. The process according to claim 1, wherein the pressure is between ½ and 5 atmospheres.

3. The process according to claim 1, wherein air is the source of the said oxygen.

4. The process according to claim 1, wherein the said oxygen is between 90 and 100 percent pure.

5. The process according to claim 1, wherein the said oxidation is at least partly aerobic.

6. The process according to claim 1, wherein aerobic bacteria are inactive in said liquid due to high pH thereof.

7. The process according to claim 1, wherein the said oxidation is at least partly non-aerobic.

8. The process according to claim 1, wherein the dissolved oxygen oxidizes at least some of the said pollutants in said aqueous liquid in said pressure zone during a residence time of from 10 minutes to 5 hours in total.

9. The process according to claim 8, wherein said oxygen is added to the suction of a pump which forces said aqueous liquid into said pressure zone, and said pressure zone includes at least part of the body of said pump.

10. The process according to claim 8, wherein said oxygen is added to the said aqueous liquid after it passes a pump pressurizing it at least to the pressure of the said pressure zone.

11. The process according to claim 8 wherein said oxygen is added in a ratio of from 1 to 50 ppm to the said aqueous liquid passing to the said pressure zone.

12. The process according to claim 1, comprising the following steps:

a. passing said joint stream with said oxygen added thereto to near the bottom of the liquid in said pressure zone, where the pressure is highest due to hydrostatic head; and b. after at least some of the pollutants in said joint stream have been oxidized, withdrawing a less polluted aqueous liquid from near the surface of the liquid in said pressure zone.

13. The process according to claim 1 comprising the following steps:

a. passing said joint stream with said oxygen added thereto in an open subdivided stream through a gas phase above the liquid phase in said pressure zone; and b. after at least some of the pollutants in said joint stream have been oxidized, withdrawing a less polluted aqueous stream from near the bottom of the said pressure zone.

14. The process according to claim 1, wherein the said more pure aqueous liquid withdrawn from said pressure zone is recycled back from 2 to 50 times to form the said joint stream with the original influent aqueous liquid which is passing in a continuous stream to be pressurized to enter said pressure zone.

15. The process according to claim 1 wherein the said depressurization of said more pure aqueous liquid is accomplished so as to recover at least some of the mechanical energy originally used in pressurizing said joint stream to the pressure of the pressure zone.

16. The process according to claim 1 wherein the said depressurization is accomplished in a water turbine mechanically connected to a pump which forces said liquid into said pressure zone, thus furnishing some part of the energy required by said pump.

17. The process according to claim 1 wherein at least some part of said more pure liquid is withdrawn from the pressure-depressurizing cycle.

18. The process according to claim 1 wherein insoluble solids are settled to the bottom of said pressure zone and are removed therefrom, said insoluble solids comprising insoluble pollutants originally present in said original aqueous liquid and those insoluble products of partial oxidation of said pollutants originally present.

19. The process according to claim 18 wherein coagulating agents are added to and mixed with the said original aqueous liquid to aid in the settling of said insoluble solids to the bottom of said pressure zone.

20. The process according to claim 18 wherein said liquid in said pressure zone is rising to be removed in a more clarified form; and the insoluble solids are coagulating, flocculating, and settling downwardly in counter-current.

21. The process according to claim 18 wherein at least a part of said insoluble solids are removed from said pressure zone, and are recycled back to join said continuous stream of said original influent liquid to said pressure zone.

22. The process according to claim 17 wherein said more pure liquid being withdrawn is passed to and through a sedimentation zone, wherein insoluble solids are settled, said sedimentation zone being at a lower pressure than said pressure zone.

23. The process according to claim 22 wherein said more pure liquid passing through at least some part of said sedimentation zone is rising, while the insoluble solids are coagulating, flocculating, and settling downwardly in counter-current thereto.

24. The process according to claim 22, wherein coagulating agents are added to and mixed with said withdrawn liquid passing to said sedimentation zone to aid in the settling of said insoluble solids therein.

25. The process according to claim 22 wherein a clarified liquid is withdrawn from an upper part of said sedimentation zone at a lower pressure.

26. The process according to claim 22 wherein said settled insoluble solids are removed from a lower part of said sedimentation zone.

27. The process according to claim 26 wherein at least some part of said removed insoluble solids are recycled back to said joint stream recycling to the said pressure zone.

* * * * *